United States Patent [19]

Pruchnicki

[11] Patent Number: 5,185,695
[45] Date of Patent: Feb. 9, 1993

[54] METHOD AND SYSTEM FOR HANDLING DISCOUNT COUPONS BY USING CENTRALLY STORED MANUFACTURER COUPONS IN PLACE OF PAPER COUPONS

[76] Inventor: Michael A. Pruchnicki, 3625 Twenty-Three Mile Rd., Utica, Mich. 48087

[21] Appl. No.: 836,143

[22] Filed: Feb. 13, 1992

Related U.S. Application Data

[63] Continuation of Ser. No. 219,563, Jul. 14, 1988, abandoned.

[51] Int. Cl.$^5$ .............................................. G26F 15/21
[52] U.S. Cl. ..................................... 364/401; 235/385
[58] Field of Search ................ 364/401; 235/383–385, 235/275

[56] References Cited

U.S. PATENT DOCUMENTS

| | | | |
|---|---|---|---|
| 4,554,446 | 11/1985 | Murphy et al. | 235/385 |
| 4,674,041 | 2/1987 | Lemon et al. | 364/401 |
| 4,723,212 | 2/1988 | Mindrum et al. | 364/401 |
| 4,821,186 | 4/1988 | Munakata et al. | 364/405 |
| 5,019,811 | 5/1991 | Olsson et al. | 340/825.35 |

FOREIGN PATENT DOCUMENTS 8502151 6/1986 PCT Int'l Appl.

OTHER PUBLICATIONS

Khabbaz, Nicholas G "Banks Can Cut Costs by Adding Other Services to EFT Networks", AN:84-35269, Orbit File: Inform, Abstract of Data Communications, vol. 13, No. 10, pp. 107–114, Sep. 1984.

*Primary Examiner*—Gail O. Hayes
*Attorney, Agent, or Firm*—Reising, Ethington, Barnard, Perry & Milton

[57] ABSTRACT

The method and apparatus for creating and processing discount coupons includes central processor (16) for receiving from manufacturers information of product type, validation period and coupon value and for producing a central coupon list of available coupon discounts. The central list is transmitted to local processors (19) of retailers (18) whom hold manufacturer products for sale. The local processor (19) produces a local coupon list based on the central list containing only those manufacturers and product type which the retailer holds for sale. A coupon indicia (12) is printed by a printer (38) and is placed adjacent the product type listed in the coupon list to identify the product as having a discount. When the product is moved through the checkout station (20), the manufacturer and product type is obtained off the product by a scanner (40) and compared to the local coupon list by a coupon comparator (46). If the product is a coupon product, the coupon value is obtained from the list and is deducted from the retail price. A coupon counter (50) accumulates, by manufacturer and product type, the total coupon discounts redeemed. The central processor (16) receives the information from the counter (50) and directly bills the manufacturer or transfers funds. No printed coupons are presented in order to obtain a discount.

20 Claims, 6 Drawing Sheets

METHOD AND SYSTEM FOR HANDLING DISCOUNT COUPONS BY USING CENTRALLY STORED MANUFACTURER COUPONS IN PLACE OF PAPER COUPONS

This application is a continuation of application Ser. No. 219,563, filed Jul. 14, 1988, now abandoned.

TECHNICAL FIELD

The invention relates to a system for the redemption of coupon discounts by a manufacturer on a coupon product without the necessity of presenting a printed coupon.

BACKGROUND OF THE INVENTION

In order for a manufacturer to give a discount on a product, it must issue a printed coupon to be redeemed by the manufacturer via a retailer or provide for a rebate to be redeemed directly by the manufacturer. Coupons have been supplied through the mail or newspapers, on the product itself, or printed at the retail outlet. In order to obtain a coupon discount on a product, a printed coupon must be presented to the checkout station. The printed coupons redeemed by the retailer are sent to a clearing house who in turn separate the coupons and bills the respective manufacturer for reimbursement of the retailer.

U.S. Pat. No. 4,554,446 issued Nov. 19, 1985 in the name of Murphy et al. discloses a supermarket inventory control system utilizing UPC codes (universal product code) on the product and UPC coupon codes on the coupons which are redeemed. This system discloses scanning the coupon code for the manufacturer, expiration date, and any other conditions. After all products have been moved through the checkout scanner, the computer system compares the coupons with the sold products to insure proper correlation for discounting.

U.S. Pat. No. 4,723,212 issued Feb. 2, 1988 in the name of Mindrum et al. discloses a coupon dispensing system for printing coupons at the retail outlet in response to the purchase of a product other than the one to which the coupon applies. A record pertaining to each item purchased is examined to determine whether the item is intended to trigger the creation of a coupon. This system also validates the coupon by ensuring the proper product is purchased and the coupon date is valid.

U.S. Pat. No. 4,674,041 issued Jun. 16, 1987 in the name of Lemon et al. discloses a coupon distribution system which uses terminals at remote locations at the retailer to advertise and print coupons as selected by consumers. The system generally provides sending coupon distribution information for each retail outlet to the manufacturer, and redemption of coupons is accomplished by the known manner of sending the information to a coupon clearing house for billing.

The problems with these types of systems include the possibilities of the counterfeiting of coupons and of fraud in the redemption of coupons. Additionally, some of these types of systems require that the consumer obtain the coupon elsewhere which decreases the redemption rate of coupons. The handling of the redeemed coupons by a clearing house requires extra cost and time for each printed coupon processing.

STATEMENT OF THE INVENTION AND ADVANTAGES

The invention is an apparatus and method of creating and processing product redemption coupons. The apparatus and method comprises coupon discount means for storing a coupon list at a retailer for use at a checkout station, display means for displaying various products, printer means for printing a coupon indicia and placing the coupon indicia adjacent a selected product for distinguishing the product from other products as a coupon product, moving the coupon product to the checkout station, coupon comparator means for comparing the coupon product to the retail redemption list, accumulator means for deducting the coupon amount from the retail price and producing a coupon paid signal for each coupon product processed through the checkout station, coupon counter means for accumulating totals from the coupon paid signals to provide total manufacturer amounts, and billing means for transferring the manufacturer amounts from each manufacturer to the retailer.

The advantages of the subject invention include preventing counterfeiting or fraud due to the fact that individual written or paper coupons are not used. The coupon discounts are obtained directly from a central data base containing the manufacturer coupons. Additionally, the manufacturer will have a one hundred percent (100%) redemption rate for the coupon because coupon discount is automatic to the product. Advertising of the product with discounts is accomplished through the coupon indicia. The subject invention reduces the cost to the manufacturers of printing and distributing coupons for consumer redemption and clearing house costs due to the accumulating of totals at the retail outlet and transferring the totals to the manufacturer.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
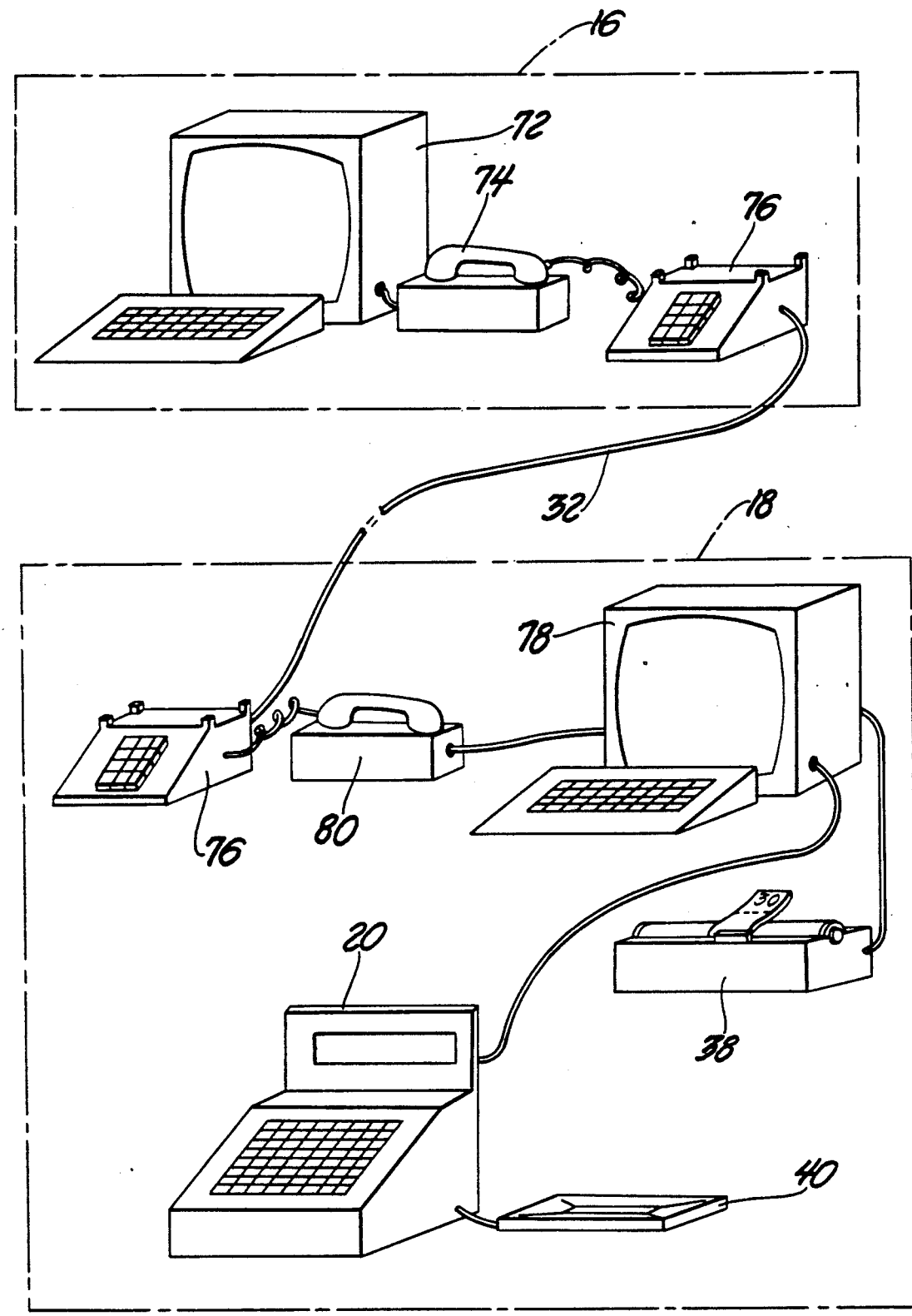
FIG. 1 is a simplified perspective diagram of the preferred embodiment of the subject invention.

A coupon handling system and method of creating and processing product redemption coupons is generally shown at 10 in FIG. 1. In general, the subject invention 10 produces manufacturer redemption coupons for products which the manufacturer has designated coupon products, without requiring a consumer to present a paper coupon at a checkout station 20.

The coupon handling system 10 is to be used in conjunction with a local or retailer outlet which stocks manufacturers' products for sale and in combination with a central system where all retailers and manufacturers provide and receive coupon information. The central system communicates with a plurality of local systems which hold manufacturers products for sale.

Figure 2:
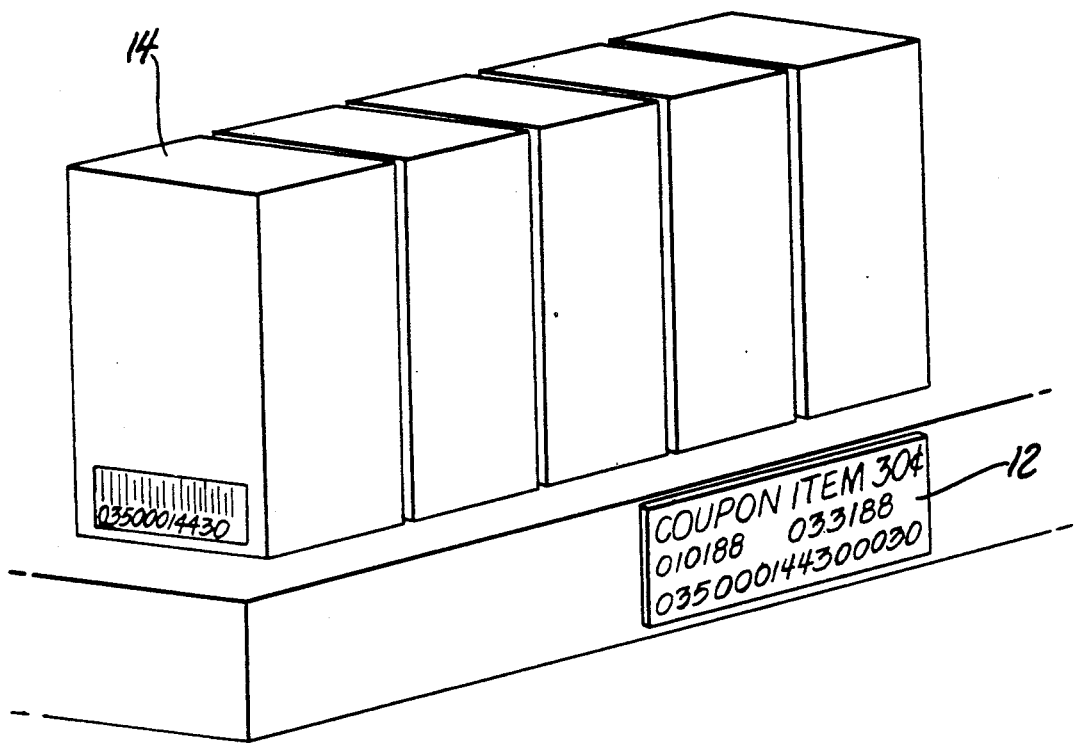
FIG. 2 illustrates the coupon indicia and use of UPC codes.
Figure 3:
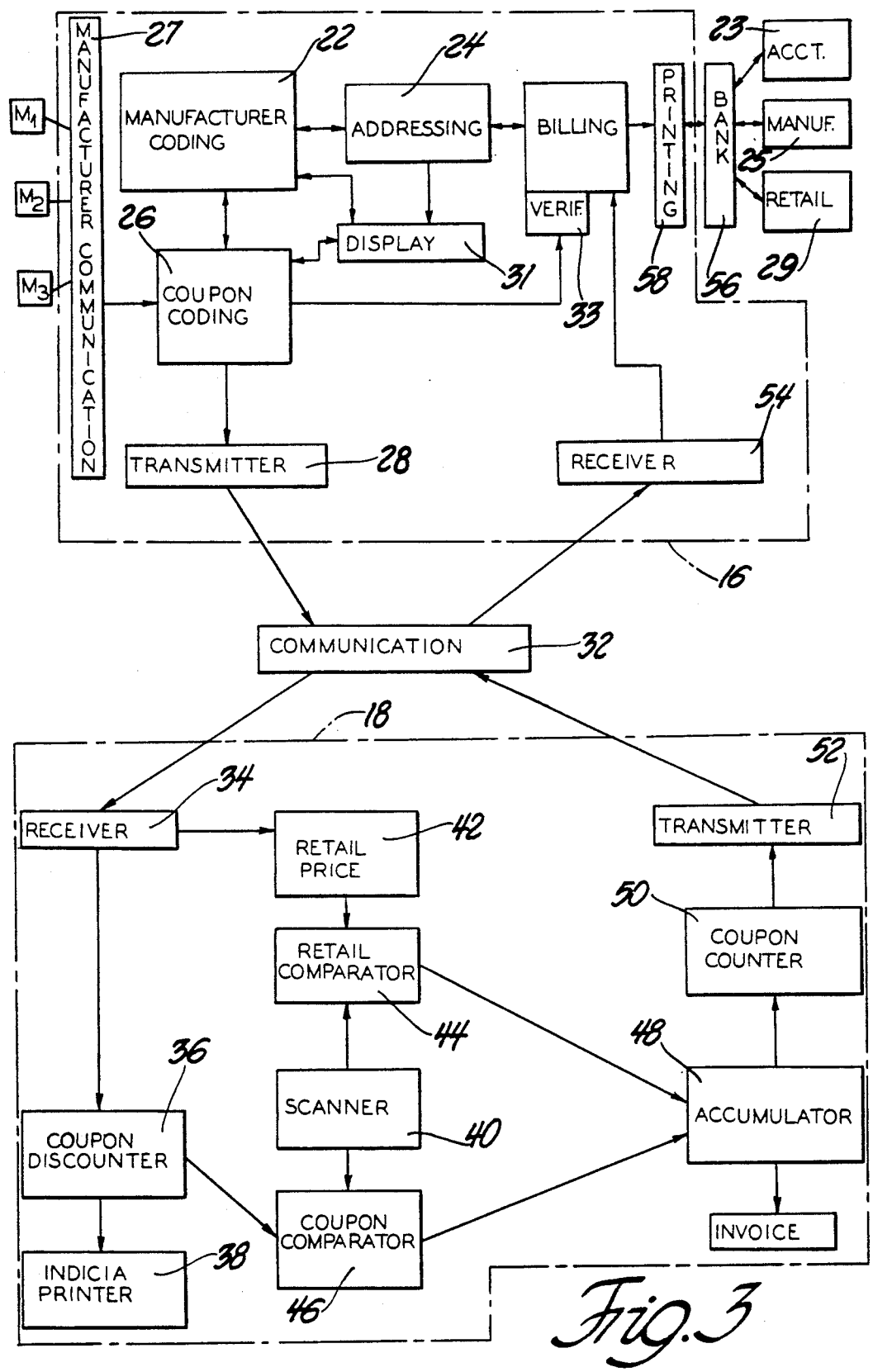
FIG. 3 is a block diagram of the subject invention.

A coupon indicia 12 used in conjunction with the subject invention is generally shown in FIGS. 1 and 2. The coupon indicia 12 is to be placed adjacent a selected product for distinguishing the product from other products as a redemption coupon product 14. In order to obtain information of which products are to be discounted by a manufacturer, a central coupon list of all products qualifying for a manufacturer redemption coupon amount is prepared.

Each manufacturer M transmits their manufacturer name or code identifying themselves, the specific product by product type, the amount of discount or discount coupon value, and the time period in which the coupon discount may be given or the validation period of the coupon, to a central or common location 16 for the preparation of the central coupon list. Each manufacturer M may transmit by written, verbal or electronic means the information relating to their coupon product 14. The central list is formatted as five columns for the manufacturer code, product type, effective date, expiration date, and coupon amount, and each successive line of the list will indicate a particular manufacturer and product type with the coupon information. The list may be expanded if other fields are desired. When searching through the list, the manufacturer is first identified and then the product type to obtain the coupon information. At this central location 16, an address list of manufacturer codes and manufacturer names along with their billing addresses is prepared for the billing process. A manufacturer code list is produced containing a list of manufacturers and their corresponding manufacturer code for identifying the manufacturer by code, if desired. Therefore, the manufacturers may communicate with the central system either by using their manufacturer name or manufacturer code. The central coupon list and manufacturer code list and address list may be in written form for the visual comparison thereof.

Once the central coupon list is prepared containing the manufacturer codes, coupon product 14 type, validation period, and discount value, the central list is transmitted to a local system or retailer outlet 18 where manufacturer products are held for sale. The list may be transmitted by written, verbal or electronic communication. The local system 18 creates a local coupon list based on the received central coupon list. The local coupon list copies the information from the central coupon list based on which manufacturer and product type the retailer stocks for sale. Extraneous information which is of no use to a particular retailer is removed from the central coupon list to produce the local coupon list. The list has the same format as the central coupon list and is stored at the local system or retailer 18. It is to be understood that when referencing the manufacturer, either actual manufacturer name or a code indicating the manufacturer is used.

The retailer has various manufacturer products displayed on shelves or in some other manner for selection by a consumer, as indicated in FIG. 2. Based upon the local coupon list, a coupon indicia 12 or sign is produced or printed identifying a product as a coupon product 14 and the amount of the coupon discount. The coupon indicia 12 is placed adjacent a selected product for distinguishing the product from other products as a coupon product. Because the individual printed coupons handed to the checkout station 20 are not used, signs or some other indicia 12 of the coupon discount availability must be produced and placed near the product 14 to inform of the discount.

In order to redeem the coupon discount, the coupon product 14 is moved or hand carried to the checkout station 20 of the retailer. At the checkout station 20, the manufacturer and product type and retail price is visually or electronically obtained off the product. The product 14 is compared, visually or electronically, against the retailer coupon list to determine whether the product is a coupon product 14 which is to be discounted. The product's manufacturer and product type are first compared against the local coupon list. If a match is found in the list, the validation period is then checked against the actual calendar date to determine validity of the coupon discount. If the product matches a record of the local coupon list and is valid and is therefore a coupon product, the discount value is deducted from the retail price. If a match of manufacturer and product type is not found or the validation period has expired, there is no discount or a zero discount price. The retail price may be marked upon the product and visually obtained. Alternatively, the retail price may be obtained from a retail price list containing the manufacturer and product type and retail price. In this case, the obtained manufacturer and product type are compared to the retail price list to get the retail price.

In response to the deduction and giving of the coupon discount, a coupon cost list is prepared which lists the manufacturer and product type and accumulates the total amounts of coupon discounts given or redeemed providing total manufacturer amounts. Each purchase of the same type of coupon product 14 will be accumulated by manufacturer and product type in a single record of the coupon cost list so that later sorting in a clearing house is unnecessary. The coupon cost list may also include the day and time the coupon was redeemed. The total manufacturer amounts are transmitted back to the central location 16 to be billed to the manufacturer. The coupon paid signal or total amounts are compared to the central coupon list for verification. The manufacturers' names, addresses, and amounts are transferred to a bank 56. The bank 56 interacts with the central account 23 and manufacturer's bank 25 and retailer's bank 29 to electronically transfer funds. The amounts are transferred out of the manufacturer's bank 25 and a processing fee is subtracted therefrom for each coupon and that fee amount transferred to the central account and the remaining is transferred to the respective retailer bank 29 as reimbursement of the redemption of coupons.

To implement a system in accordance with the above-described method, the central location comprises central processor means 16 for producing the central coupon list correlating manufacturers and their products upon which a coupon discount is to be given, and acquiring the discounted amounts redeemed for the manufacturer and its product. More specifically, the central processor means 16 includes manufacturer coding means 22 for producing the manufacturer code list of manufacturers and corresponding manufacturer codes for identifying manufacturers by name and code. The central processor means 16 includes addressing means 24 for producing a list of manufacturer codes with manufacturer names and their mailing or billing addresses. It is to be understood that the manufacturer coding means 22 and the addressing means 24 may be combined into a single means.

The central processor means 16 also includes a coupon coding means 26 for producing the central coupon list of manufacturer codes with product type and validation period and discount or redemption value to be received from the manufacturer. Manufacturers send or transmit their manufacturer code and the product type, discount amount, and validation period to the central processor means 16. The coupon coding means 26 produces the central coupon list based on this information, which is subsequently transmitted to the retailer. The central processor means 16 includes manufacturer transmission means 27 for receiving the manufacturer information, and optional transmitting the billing. The central processor means 16 includes central transmitter means 28 for transmitting the central coupon list to the retailer Alternatively, the list may be transmitted verbally to the retailers.

Also included is billing means 30 for receiving the total manufacturer redemption amounts from the local system or retailer 18 and combining with the addressing means 24 to bill the manufacturer for the discount coupons given by the retailer. The billing means 30 includes verification means 33 for comparing the manufacturer and product type of the coupon cost list of total manufacturer amounts to the manufacturer and product type in the central coupon list for verification that the coupon given was valid. The lists may be hand or type written. Alternatively, the central processor means 16 may be implemented by a computer having communication ability to transmit the lists. In the case that the central processor means 16 is implemented by the computer, included is list display means 31 for visually displaying the lists accumulated by the central processor means 16. The display means 31 may be a computer or CRT (cathode ray tube) screen.

The system 10 includes communication means 32 for sending information between the central processor means 16 and the retailers 18. More specifically, the communication means 32 transmits the central coupon list received from the central transmitter means 28 to retailers 18 and transmits the manufacturer total amounts of discounts given to the central processor means 16 for billing. Such communication means 32 may include mail, telephone communication, radio signals, or any other type of communication mode.

The local system or retailer 18 includes local processor means 19 for receiving the central coupon list and for giving coupon redemptions to products passing through its checkout 20 and reporting transactions to the central processor means 16. The local processor means 19 includes local receiver means 34 for receiving the central coupon list off the communication means 32. The local processor means 19 includes coupon discount means 36 for storing the central coupon list and for creating the local coupon list based on manufacturers whose products are stocked and on sale at the retail outlet 18. The local coupon list preferably contains only the manufacturers whose products are held for sale at the retailer outlet. Through this list, the coupon discounts are obtained on coupon products without the requirement of presenting a printed coupon for any of the coupon product.

At the retailer location, various products are displayed by product display means 37 which may include shelves or the like. The coupon indicia 12 must also be displayed to distinguish coupon products from other products. The system 10 includes coupon printer means 38 for printing coupon redemption indicia 12 of a selected product given a coupon discount or redemption by the manufacturer. The redemption coupon indicia 12 is placed adjacent a selected product for distinguishing the product from other products as a redemption coupon product. The coupon printer means 38 generally is located at the local processor means 19 for printing coupon indicia 12 as indicated in the local coupon list. Alternatively, the manufacturer may have labels printed on each product individually and directly indicating such discount, but still will be included on the coupon lists.

In order to obtain the coupon redemption, the redemption coupon product 14 is moved to the checkout station 20. The local processor means 19 includes scanning means 40 for reading or obtaining the product manufacturer, product type, and retail price from the product or product label. The local processor means 19 may include retail pricing means 42 for storing a list containing manufacturers and product types and their associated retail price In this alternative, the retail pricing means 42 receives the manufacturer and product type from the scanning means 40 and includes retail price comparator means 44 for comparing this information to the retail list to obtain the retail price. The local processor means 19 includes retail price comparator means 44 for comparing the product manufacturer and product type with the local coupon list to determine if the product is a coupon product 14 and the amount of the discount. The coupon comparator means 46 searches through the retailer coupon code file for the manufacturer and then the product type and, if found, determines whether the effective date and expiration date is valid. If valid, the discount value is obtained for the deduction from the retail price for the invoice 82. Accumulator means 48 deducts the discount or redemption amount from the retail price. The accumulator means 48 will produce a redemption coupon paid signal for each redemption coupon product 14 passed through the checkout station 20 and redeemed.

Figure 4:
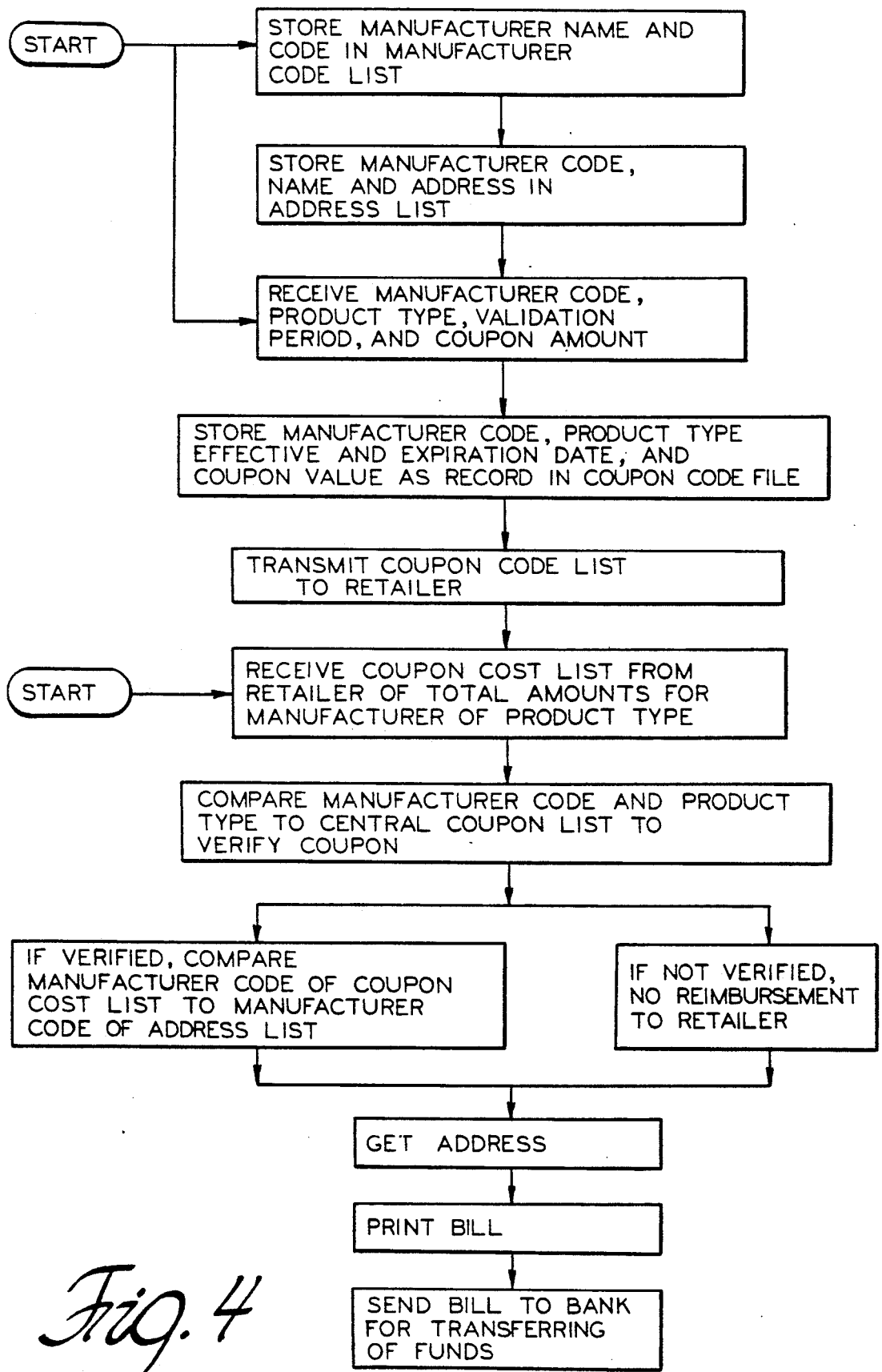
FIG. 4 is a flow chart of the central processor of the subject invention.
Figure 5A:
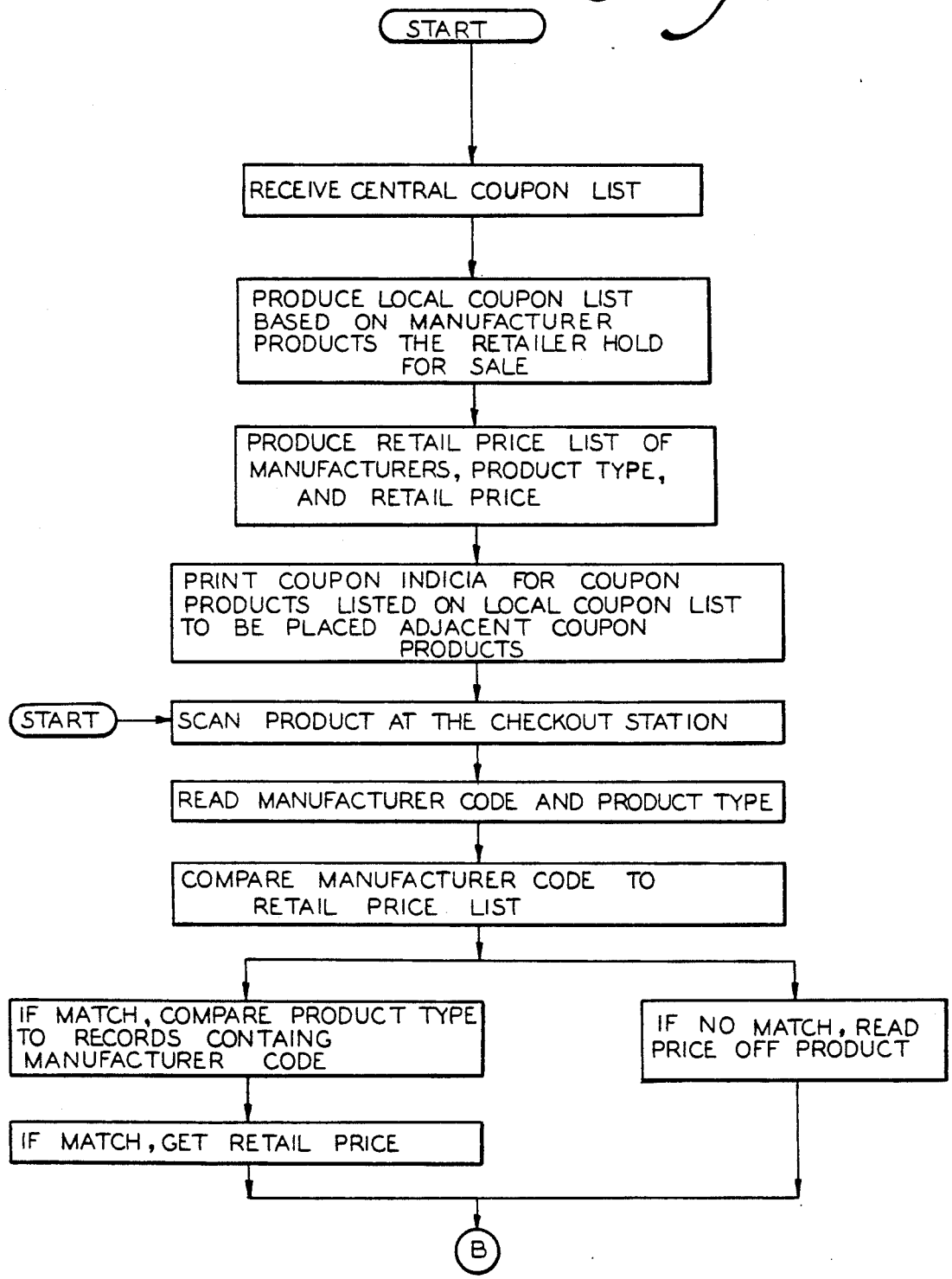
FIGS. 5a–b is a flow chart of the local processor of the subject invention.
Figure 5B:
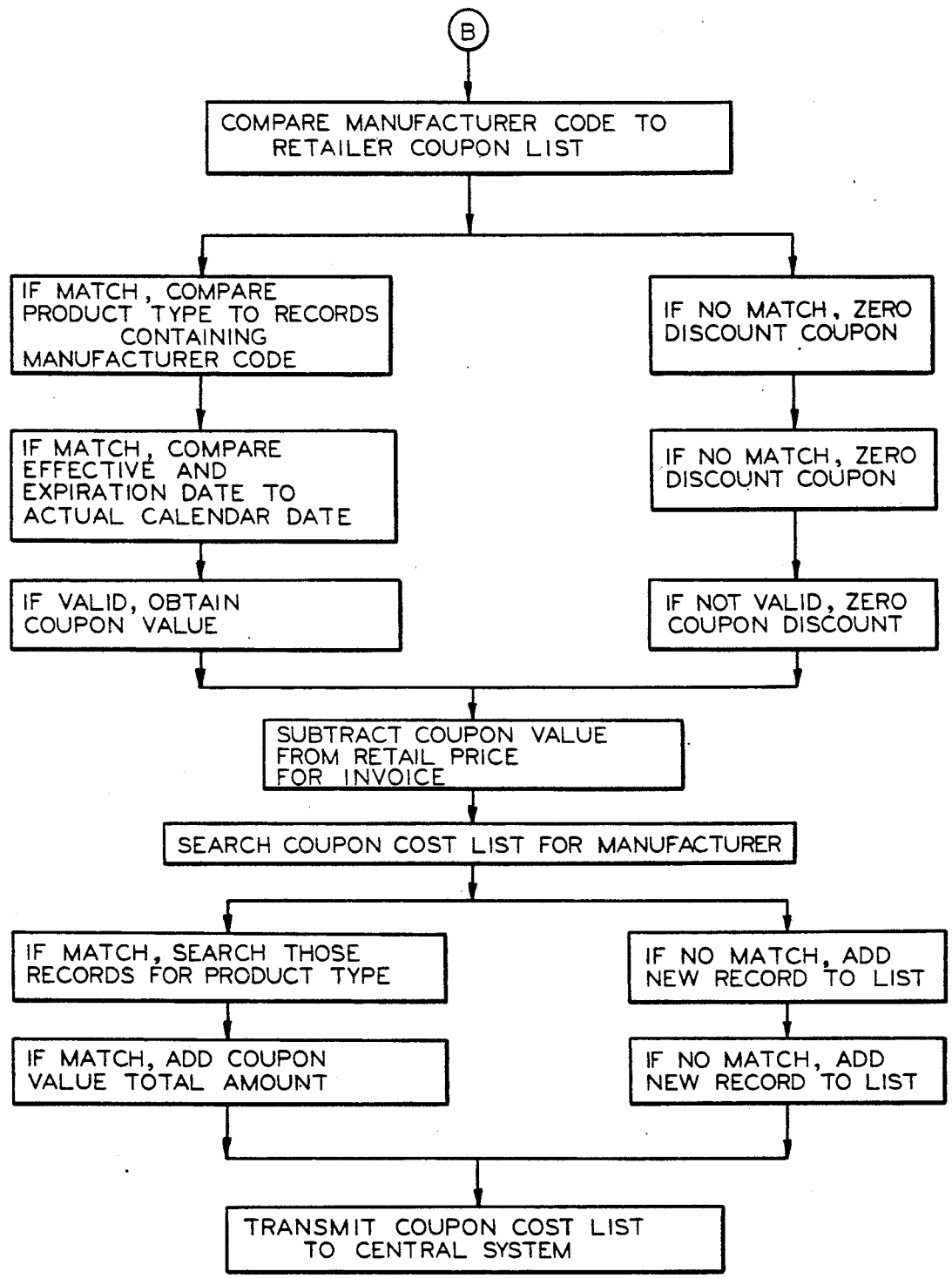

The local processor means 19 includes coupon counter means 50 for receiving the redemption coupon paid signal and accumulating totals for the redemption coupon paid signals to provide total manufacturer amounts. Each time a coupon product 14 is moved through the checkout station 20, the coupon counter means 50 increases the redemption amount by the discount value for the particular manufacturer and product type of the coupon product. The coupon counter means 50 produces a coupon cost list of manufacturer and product type and total discounted or redemption amounts for the particular product type. The local processor means 19 includes local transmitting means 52 for transmitting the coupon cost list of total manufacturer amounts contained within the coupon counter means 50 to the central processor means 16 via the communication means 32. The local processor means 19 may be implemented by a computer having communication capabilities, and software following the flowchart of FIG. 4.

The central processor means 16 includes central receiver means 54 for receiving from the communication means 32 the coupon cost list. The billing means 30 of the central processing means receives the received coupon cost list of total manufacturer amounts and compares the manufacturer code with the address list of the addressing means 24 to obtain the address and manufacturer name for billing the manufacturer for the total discounted amounts for the particular product type.

The verification means 33 compares each manufacturer and product to the central coupon list to verify the availability of a coupon. If the coupon is not verified, no coupon reimbursement is given to the retailer. The manufacturer amounts are then billed to each manufacturer. More specifically, the billing means 30 compares each manufacturer code on the coupon cost list to the address file for obtaining the manufacturer's name and address to bill the manufacturer by the amounts listed on the coupon cost list. In the preferred embodiment, the billing means 30 produces a bill for each manufacturer, prints the bill by a printer 58 and transfers it to a bank 56. The bank 56, in turn, via electronic transfer of funds (ETF) obtains the funds from manufacturer bank 23, subtracts processing costs to be placed in central account 25 and transfers the funds to the retailer bank 29. Other transferring means may be used. Alternatively or simultaneously, the billing printer means 58 prints a written copy of the manufacturer amounts for records and billing.

Each of the above mentioned means may be manually implemented such as through a person comprising the various means, or electronically as in the preferred embodiment as discussed below. It is to be understood that the invention is not limited to this specific implementation scheme. The lists previously described may be in the form of files or data bases.

In the preferred embodiment, the subject system utilizes UPC codes (Universal Product Code) which are generally twelve-digit fields, as illustrated in FIG. 2. The product code is used to identify the number system, manufacturer's identification, and the item code. This product code is located on the manufacturer's product. Printed coupons include a similar UPC code, or coupon code, which comprises an eleven-digit field. The coupon code is used to identify the number system, manufacturer's identification, family code and value code. The number system digit is designed to differentiate coupons from the general product identification. Presently, a "5" is used to indicate a coupon and a "0" is used to identify the product. The manufacturer's identification is a five-digit code which corresponds to the manufacturer's identification. The item code in the product code is a five-digit code and the family code in the coupon code is a three-digit code, both distinguishing the difference between sizes, colors, shapes, weights, flavors, and multipacks of the particular product. The value code is a two-digit code that is essential to the coupon code. The value code designates the redemption value of the coupon. In the preferred embodiment, the value code is expanded from two digits to four digits, and the coupon code record is expanded to include the "effective date" and the "expiration date" for determining validation period of the coupon discount. Each of these dates would include a six-digit code. Therefore, the coupon code would include twenty-seven digits. The coupon code may have a variable length depending on what manufacturers and retailers desire. All digits in the coupon code can be created by the manufacturer as soon as the universal product code is created, if necessary.

As illustrated in FIG. 2, the UPC code on the product is "0 35000 14430". The number system digit is "0", the manufacturer identification or code is "35000", and the item code is "14430" The UPC coupon code on the coupon indicia 12 and in the coupon code file and retailer coupon file is "035000144300030010188033188". The number system is "0", the manufacturer identification is "35000", the item code is "14430", the value code is "0030" representing thirty cents, the effective date is "010188" representing Jan. 1, 1988 and the expiration date is "033188" representing Mar. 31, 1988. The manufacturer codes must match and the item codes must match and the actual calendar date must be within the validation period in order to become a coupon product.

The central processor means 16 is implemented though a computer 72 or microprocessor with memory and software, and memory 61 to store the central coupon list and address list and manufacturer code list as files. The computer 72 processes the data in the files in accordance with the prior description of the manufacturer coding means 22, addressing means 24, coupon coding means 26, display means 31, billing means 30, verification means 33 and transmitter 28 and receiver 54. The format of the central coupon list file is formatted as the previously described coupon list. The coupon list file contains records each having five fields. A manufacturer field contains the five-digit or character manufacturer identification or code, a product field contains the five-digit item code or product type, a value field contains the four-digit coupon value, the effective field contains the six-digit effective date of the coupon, and the expiration field contains the six-digit expiration date of the coupon. Records having the same manufacturer would be grouped together, each record containing a different product type. The address list file contains a record for each manufacturer and product type and formatted as each record having at least three fields. A code field contains the five-digit manufacturer code, a name field contains a variable field length for the manufacturer name, and an address field contains a variable length field for the address of the manufacturer.

The list display means 31 is connected to the computer and includes a keyboard to visually present the lists on the screen allow for input of manufacturer information into the various lists and/or correction and/or deletion. The communication means 27, 32 may be a modem 74 for communication through the telephone 76 lines to and from the central processor means 16, the retailers, and the manufacturers M, as indicated in FIG. 1. The initial information regarding manufacturer and their discounts is transmitted via the manufacturer communication means 27, as well as the billing, and may include a modem for communication via telephone lines, or verbally.

The coupon coding means 26 receives the manufacturers' information regarding the selected coupon product 14 and redemption value and validation period, via the modem or by mail or verbally to be inputted by the list display means 31. The coupon coding means 26 transfers the information into the UPC coupon code format and stores it in the central coupon file in the respective fields.

The local processor means 19 may also be implemented through a computer 78 having a modem 80 or other communication means 32, and the printer. The computer 19 receives the central coupon list and stores it in its memory. The scanning means 40 is a laser reader as commonly known in the art, for reading the UPC code on a selected product. The scanning means 40 obtains the five-digit manufacturer code and the item code from the product. The local processor means 16 may also produce the retail price list of the product type and the retail price as a price file in the computer memory. The price file contains three fields per record which include the five-digit manufacturer code, the five-digit item code and the retail price. The scanned UPC code from the product is compared by the retail price comparator means 44 with to the retail price file to obtain the retail price of the product. The retail price comparator means 44 first compares the scanned manufacturer code to the manufacturer code field determine a match, and when a match then searches the records having common matched manufacturers for the scanned item code or product code in the item code field. When a match is found, the retail price is obtained. Alternatively, the retail price may be visually taken from the product and input into the computer 19 via the checkout station 20 register. The manufacturer and item code are compared to the local coupon list to determine if the product is a coupon product 14. The coupon comparator means 46 searches the local coupon file for the scanned manufacturer code in the manufacturer field. If there is a match between the scanned manufacturer code and manufacturer code in the manufacturer field those manufacturer records are searched for the scanned item code in the product field. If a match is obtained, the validation period is taken from the effective field and the expiration field and the coupon value is obtained. The discount value is deducted from the retail price by the accumulator means 48 of the checkout station 20 and added to other product prices for the customers invoice.

Additionally, the manufacturer and product type and discount value is accumulated in the coupon cost file. The coupon cost file is formatted to contain at least three fields per record. A manufacturer field is a five-digit code corresponding to the field of the other files, a product field is a five-digit field also corresponding to the fields of the other files, and a totals field contains the manufacturer total amounts of coupon discounts given the product by the retailer 18. In response to a redemption coupon paid signal, the signal contains the manufacturer, product type and value given on the coupon product. The coupon counter means 50 receives the signal and searches the coupon cost file for the manufacturer and the product coupon in the same record. If a match is obtained, the discount value is added to the totals field. If a match is not found, the coupon counter means 50 adds a new record to the coupon cost file for the manufacturer and product type and discount value. The accumulated coupon cost file may be transmitted via the communication means 32 to the central processor means 16.

The billing means 30 receives the coupon cost file and compares the records of the file with the address file for billing. The manufacturer and product type of a record of the coupon cost file is compared to the code field of the address file to obtain the manufacturer name and address. The central processor means 16 includes the billing printer 58 for printing out the bills. The bills will contain the manufacturer name and billing address and product code and total amount of discounts given for a particular retailer 18. Day and time of each redemption may also be included. The bills are sent to the bank 56 which, in turn, electronically transfer funds from manufacturer's bank to retailer and central account.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of creating and processing product redemption coupons comprising the steps of: preparing a central list of products qualifying for a manufacturer redemption coupon amount, transmitting product data from the central list to a retainer for storage in a coupon redemption list for use at a checkout station at the retailer, displaying various products, placing coupon indicia adjacent a selected product for distinguishing the product from other products as a manufacturer coupon product which products are on the central list, selecting a redemption coupon upon movement and presentation of the associated coupon product to the checkout station exclusive of prior selection of the coupon by a purchaser, obtaining a retail price of the coupon product, comparing the coupon product with the coupon redemption list and deducting the coupon amount from the retail price such that the retail price of all coupon products available at the retailer and on the central list will be automatically deducted by the coupon amount exclusively and independently of any selection by the purchaser other than moving the product to the checkout station, producing a paid signal for each redemption coupon product processed through the checkout station, accumulating totals from the paid signals to provide total manufacturer amounts, and transferring the manufacturer amounts from the retailer to each manufacturer whereby every product having a coupon associated therewith on the central list is automatically reduced by the coupon amount at the checkout station solely upon selection and movement of a product to the checkout station exclusive of any other selection of the coupon by the purchaser.

2. A method as set forth in claim 1 further defined as transmitting the coupon paid signal for verification with the central list.

3. A method as set forth in claim 1 wherein the transferring of the manufacturer amounts is further defined as transmitting the total manufacturer amounts to an exchange bank to transfer the manufacturer amounts from each manufacturer to the retailer 4. A method as set forth in claim 1 further defined as preparing the central list from received manufacturer code, product type, validation period and coupon value.

5. A method as set forth in claim 1 further characterized by preparing an address list of manufacturers and billing addresses and comparing the manufacturer of the coupon product redeemed to obtain the address of the manufacturer for billing.

6. A method as set forth in claim 1 further defined as printing and placing a coupon code upon a product to identify the manufacturer and a coupon amount.

7. A method as set forth in claim 1 further including selecting coupon products from the central list of all coupon products available at a particular retailer in the coupon redemption list whereby coupon products not available at the retailer are excluded.

8. A method of creating and processing product redemption coupons comprising the steps of: placing a coupon code upon a product to identify the manufacturer and a redemption amount, preparing a central list of products qualifying for a manufacturer redemption coupon amount, storing a redemption coupon list at a retailer for use at a checkout station, transmitting selective product data from the central list to a retailer coupon redemption list of all products available at the retailer which qualify for a manufacturer redemption coupon amount for the retailer, printing coupon indicia for a selected product from the retail coupon redemption list, displaying various products, placing coupon indicia adjacent a selected product for distinguishing the product from other products as a redemption coupon product, selecting a redemption coupon only by physical selection of the redemption coupon product, selecting a redemption coupon upon movement and presentation of the associated coupon product to the checkout station exclusive of prior selection of the coupon by a purchaser, obtaining a retail price for the coupon product, comparing the redemption coupon product with the redemption coupon list and reducing the redemption amount for the retail price ensuring that the retail price of all coupon products listed on the central list and available at the retailer are deducted by the coupon amount exclusively and independently of any selection by the purchaser other than moving the product to the checkout station, producing a redemption coupon paid signal for each redemption coupon product processed through the checkout station, transmitting the redemption coupon paid signal, accumulating totals from the redemption coupon paid signal, accumulating totals from the redemption coupon paid signals to provide total manufacturer amounts, transmitting the total manufacturer amounts to a bank, and transferring the manufacturer amounts from each manufacturer to the retailer whereby every product having a coupon associated therewith on the central list is automatically reduced by the coupon amount at the checkout station solely upon selection and movement of a product to the checkout station exclusive of any other selection of the coupon by the purchaser.

9. A method of creating processing product redemption coupons comprising the steps of: receiving coupon discount amounts for coupon products from the manufacturer of the product, preparing a central list of all products qualifying for a manufacturer redemption coupon amount which includes a designation of product type, transmitting the central list of coupon product to a retailer, selecting coupon products from the central list of all coupon products available at a particular retailer, storing the selected coupon products in a retail redemption list at the retailer for use at the checkout station whereby coupon products not available at the retailer are excluded from the retail redemption list, moving the coupon product to the checkout station, and comparing the coupon product to the retail redemption list and automatically reducing the coupon amount from the retail price.

10. A method as set forth in claim 9 further defined as printing and placing a coupon code upon a product to identify the manufacturer and a coupon amount.

11. A method of creating and processing product redemption coupons comprising the steps of: receiving a central list of products qualifying for a manufacturer redemption coupon amount, storing a coupon list of products available at a retailer which qualify for a manufacturer redemption coupon amount at the retailer from the central list for use at a checkout station, displaying various products, selecting a redemption coupon only by physical selection of the coupon product and presentation of the coupon product to the checkout station exclusive of prior selection of the coupon by a purchaser, comparing the coupon product with the retail redemption list and reducing the coupon amount from the retail price ensuring that the retail price of all coupon products available at the retailer are deducted by the coupon amount exclusively and independently of any selection by the purchaser other than moving the product to the checkout station, producing a paid signal for each redemption coupon product processed through the checkout station, accumulating total manufacturer amounts for billing the manufacturer, and transferring the total manufacturer amounts whereby every product having a coupon associated therewith on the central list is automatically reduced by the coupon amount at the checkout station solely upon selection and movement of a product to the checkout station exclusive of any other selection of the coupon by the purchaser.

12. A method as set forth in claim 11 further including selecting coupon products from the central list of all coupon products available at a particular retailer in the coupon redemption list whereby coupon products not available at the retailer are excluded.

13. A system for creating and processing product redemption coupons, said system comprising: communication means (32) for transmitting a central list of products qualifying for a manufacturer redemption amount, coupon discount means (36) for receiving said central list and storing a coupon list containing manufacturer and product type and coupon amount at a retailer of all products on the coupon list and available for purchase having a redemption coupon associated therewith for use at a checkout station (20) from said central list, display means for physically displaying various products, printer means (38) for printing a coupon indicia for placement adjacent a selected product at said display means for distinguishing the product from other products as a coupon product, scanning means (40) for obtaining the manufacturer and product type and retail price base on said coupon product moved to the checkout station (20), coupon comparator means (46) for comparing the manufacturer and product type of the coupon product with said coupon list to obtain the coupon amount such that all coupon products available at the retailer and on said coupon list obtain the coupon amount exclusively and independently of any coupon selection by the purchaser other than moving and presenting the product to the checkout station, accumulator means (48) for deducting the coupon amount from the retail price producing a paid signal for each coupon product processed through the checkout station, coupon counter means (50) for accumulating totals from the paid signals to provide a total manufacturer amount for that coupon product, and billing means (30) for transferring the manufacturer amounts from each manufacturer to the retailer whereby every product having a coupon associated therewith on the central list is automatically reduced by the coupon amount at the checkout station solely upon selection and movement of a product to the checkout station exclusive of any other action, selection and independently of actual knowledge of the coupon by the purchaser.

14. A system as set forth in claim 13 further including central processor means for communicating between retailer and manufacture, said central processor means (16) including coupon coding means (26) for preparing a central list of all products qualifying for a manufacturer redemption coupon amount, and said communication means (32) for transmitting said central list to said coupon discount means (36) for obtaining said coupon list from said central list.

15. A system as set forth in claim 14 further characterized by said central processing means (16) including manufacturer coding means (22) for producing a list of manufacturer codes with manufacturer names and billing addresses.

16. A system as set forth in claim 13 further characterized by said billing means (30) for receiving the manufacturer total amounts via the communication means (32) and comparing the manufacturer to said manufacturer coding means (22) for billing the manufacturer.

17. A system as set forth in claim 16 further characterized by including retail pricing means (42) for storing a price list containing manufacturers and product types and the retail price such that said scanning means (40) obtains the manufacturer and product type from the product, and retail price comparator means (44) for comparing the obtained manufacturer and product type to said price list to obtain the retail price of the product.

18. A system as set forth in claim 16 further characterized by said central processor means (16) including verification means (31) for comparing said coupon paid signals to said central list for verifying a coupon discount.

19. A method of creating and processing product redemption coupons comprising the steps of: receiving and storing a coupon redemption list of products available at the retailer which qualify for a manufacturer redemption coupon amount for use at a checkout station at the retailer, displaying various products, selecting a redemption coupon upon movement and presentation of the associated coupon product to the checkout station exclusive of prior selection of the coupon by a purchaser, obtaining a retail price of the coupon product, comparing the coupon product with the coupon redemption list and deducting the coupon amount from the retail price such that the retail price of all coupon products available at the retailer and on the central list will be automatically deducted by the coupon amount exclusively and independently of any selection of the purchaser other than moving the product to the checkout station, producing a paid signal for each redemption coupon product processed through the checkout station, accumulating totals from the paid signals to provide total manufacturer amounts whereby every product having a coupon associated therewith on the central list is automatically reduced by a coupon amount at the checkout station solely upon selection and movement of a product to the checkout station exclusive of any other selection of the coupon by the purchaser.

20. A method of creating processing product redemption coupons comprising the steps of: receiving and storing a coupon redemption list of coupon products which qualify for a manufacturer redemption coupon amount for use at a checkout station at a retailer, selecting coupon products from the central list of all coupon products available at a particular retailer, storing the selected coupon products in a retail redemption list at a retailer for use at the checkout station whereby coupon products not available at the retailer are excluded from the retail redemption list, moving the coupon product to the checkout station, and comparing the coupon product to the retail redemption list and automatically reducing the coupon amount from the retail price.

* * * * *